United States Patent [19]

Nakamura

[11] Patent Number: 4,627,370

[45] Date of Patent: Dec. 9, 1986

[54] SEWING MACHINE DRIVE DEVICE

[75] Inventor: Takashi Nakamura, Aichi, Japan

[73] Assignee: Mitsubishi Denki Kabushiki Kaisha, Tokyo, Japan

[21] Appl. No.: 491,962

[22] PCT Filed: Aug. 20, 1982

[86] PCT No.: PCT/JP82/00326

§ 371 Date: Apr. 18, 1983

§ 102(e) Date: Apr. 18, 1983

[87] PCT Pub. No.: WO83/00708

PCT Pub. Date: Mar. 3, 1983

[30] Foreign Application Priority Data

Aug. 20, 1981 [JP] Japan .................................. 56/130718
Aug. 20, 1981 [JP] Japan .................................. 56/130719

[51] Int. Cl.⁴ ............................................. D05B 69/22
[52] U.S. Cl. ..................................................... 112/275
[58] Field of Search ................... 112/275, 277, 67, 87, 112/285, 300; 318/369, 376

[56] References Cited

U.S. PATENT DOCUMENTS 4,137,860  2/1979  Yoneji et al. ................... 112/275 X
4,161,921  7/1979  Nishida et al. ....................... 112/275
4,195,582  4/1980  Novick ........................... 112/275 X
4,530,297  7/1985  Fujikawa ............................ 112/275

OTHER PUBLICATIONS

Yasukawa Electric Mfg. Co., Ltd., vol. 36, No. 138, Feb. 1972.

Primary Examiner—Peter Nerbun
Attorney, Agent, or Firm—Sughrue, Mion, Zinn, Macpeak & Seas

[57] ABSTRACT

This invention relates to sewing machine drive devices, and more particularly to a sewing machine drive device which, in order to stop the sewing needle at a desired position, drives the sewing machine at an ultra low speed and changes the speed of the sewing machine to a desired value immediately before the needle is stopped. The device comprising a sewing machine drive mechanism having an induction motor (14) and a braking unit (18), and a position detector (24) coupled to the output side of the induction motor, for detecting a sewing needle's position, the induction motor being subjected to variable speed driving by a motor speed control circuit (32) including an inverter circuit, and the braking unit (18) being operated with the aid of a detection signal from the position detector (24).

3 Claims, 9 Drawing Figures

SEWING MACHINE DRIVE DEVICER

TECHNICAL FIELD

This invention relates to sewing machine drive devices, and more particularly to a sewing machine drive device which, in order to stop the sewing needle at a desired position, drives the sewing machine at an ultra low speed and changes the speed of the sewing machine to a desired value immediately before the needle is stopped.

BACKGROUND ART

A conventional sewing machine drive device is designed as follows:

The electromagnetic clutch is excited by depressing the foot pedal so that it is electromagnetically coupled to the flywheel which is coupled to the rotor of a sewing machine drive motor which is rotated at all times, and the sewing machine is driven through the electromagnetic clutch thus coupled.

Furthermore, by changing the amount of depression of the foot pedal, an electromagnetic clutch exciting current from the motor speed control circuit is controlled, so that the speed of the sewing machine is controlled to a desired value according to the amount of depression of the foot pedal.

Thus, the conventional sewing machine drive device is disadvantageous in the following points: As the drive motor is rotating at all times whether the sewing machine is driven or stopped, the drive device consumes electric power uneconomically. Since the flywheel has a large moment of inertia, it is difficult to change the direction of rotation of the motor at a desired time. If a friction type electromagnetic clutch is employed, the service life of the drive device is reduced because the clutch is subject to wear.

In order to overcome the above-described difficulties, a sewing machine drive device has been proposed in Japan, in which a print motor is employed as the sewing machine drive motor and is driven by direct current, and the electromagnetic clutch is eliminated, and in which the print motor is directly started or stopped or driven at various speeds according to the operation of the foot pedal. The drive device has an excellent control characteristic because of the employment of the DC motor; however, it is still disadvantage in the following points: The brushes are subject to wear which reduces the service life, thus requiring inspection and maintenance. Since the motor is started and stopped whenever the foot pedal is in operation, the start current is large. Accordingly, a large capacity power source must be employed, and the drive control circuit is bulky, which results in a high manufacturing cost of the drive device.

DISCLOSURE OF THE INVENTION

In view of the foregoing, a first object of this invention is to provide a novel sewing machine drive device in which an AC induction motor is employed as the drive motor, and it is driven by a variable voltage/variable frequency inverter circuit, so that the sewing machine is driven at various speeds, whereby the above-described difficulties accompanying a conventional sewing machine drive device are eliminated.

A second object of the invention is to provide a novel sewing machine drive device in which an AC induction motor is used as the drive motor, and it is driven by an inverter connected in series to a converter, so that the sewing machine is driven at various speeds, and in which, when the speed of the machine is reduced, regenerative braking is effected with the converter being operated as inverter, whereby the above-described difficulties accompanying a conventional sewing machine drive device, and energy is economically used.

The first object of the invention has been achieved by the provision of a sewing machine drive device comprising: a sewing machine drive mechanism having an induction motor and a braking unit; and a position detector connected to the output side of the induction motor, for detecting a sewing needle's position; which, according to the invention, comprises: a stop position control section for causing an inverter circuit to subject the induction motor to variable speed driving and operating the braking unit with the aid of a detection signal from the position detector, to stop the sewing needle at a predetermined position.

The second object of the invention has been achieved by the provision of a sewing machine drive device comprising: a sewing machine drive mechanism having an induction motor and a braking unit; and a position detector connected to the output side of the induction motor, for detecting a sewing needle's position; which, according to the invention, comprises: a stop position control section for causing an inverter connected in series to a converter to subject the induction motor to variable speed driving and operating the braking unit with the aid of a detection signal from the position detector; and a speed reduction control section for operating, when the speed of the sewing machine is reduced, the converter as inverter, to carry out regenerative braking.

DETAILED DESCRIPTION OF THE PREFERRED EMBODIMENT(S)

Figure 1:
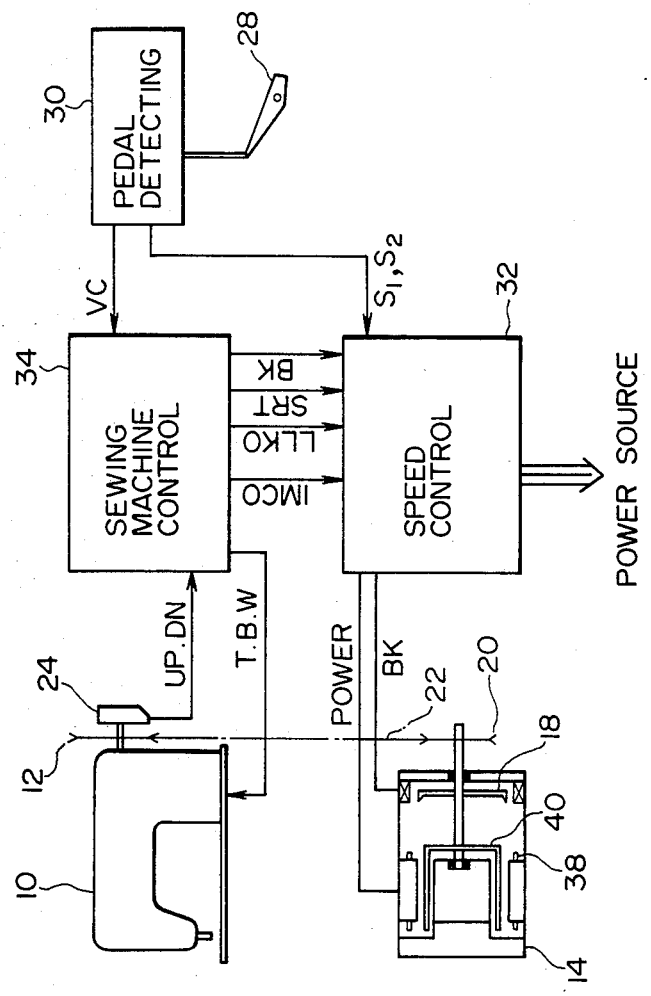
FIG. 1 is an explanatory diagram outlining the arrangement of one example of a sewing machine drive device according to this invention.

An embodiment of the invention for achieving the above-described first object of the invention will be described. In FIGS. 1 through 7, reference numeral 10 designates a sewing machine; 12, a machine pulley; 14 a drive motor including an electromagnetic brake 18, and comprising an AC induction motor; 20, a motor pulley which is coupled to the machine pulley 12 through a belt 22.

Reference numeral 24 designates a position detector which is coupled to the machine 10, for detecting a needle position; and 40, a cup-shaped rotor is included in the drive motor 14 in such a manner as to confront the stator 38 of the motor. The rotor 40 has a low moment of inertia.

The sewing machine 10 is so designed as to be able to carry out variable speed operation and predetermined position stop through the drive motor with the aid of a motor speed control circuit 32 including a variable voltage/frequency inverter circuit.

Figure 2:
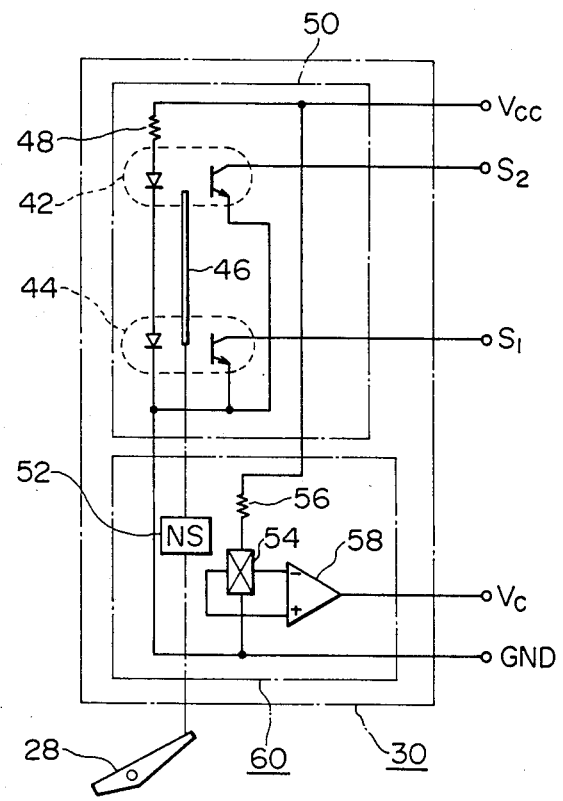
FIG. 2 is an explanatory diagram showing the detailed arrangement of a pedal detecting circuit in FIG. 1.

A pedal detecting circuit 30 is coupled to a foot pedal 28 and is as shown in FIG. 2 in detail. The arrangement of the circuit 30 will be described.

The detecting circuit 30, as shown in FIG. 2, comprises: a photo-sensor section 50 including photo-interruptors 42 and 44, a shielding plate 46 moving in the gaps in the photo-interruptors and a resistor 48; and a magnetic sensor section 60 including a magnet 52 operating in association with the shielding plate 46, a Hall element 54 for magnetically coupling to the magnet 52, to providing a speed instruction during sewing, a resistor 56 connected to the Hall element 54, and an amplifier 58 for amplifying the speed instruction from the Hall element 54 to apply a speed instruction signal VC to the control circuit 32. The shielding plate 46 and the magnet 52 is operated in association with the foot pedal 28.

The foot pedal 28 is depressed. In this operation, the degree of magnetic coupling between the magnet 52 and the Hall element and accordingly the speed instruction signal VC depends on the amount of depression of the foot pedal 28. As the shielding plate 46 is moved downwardly, the outputs of the photo-interruptors 42 and 44 becomes "0" and "1", respectively and are supplied as operation instruction signals $S_1$ and $S_2$ representing the fact that the sewing operation is being carried out to the control circuit 32. When the foot pedal 28 is at the neutral position as shown in FIG. 2, the operation instruction signals $S_1$ and $S_2$ are set to "0" and therefore the control circuit 32 detects the fact that the pedal is at the neutral position. When the pedal 28 is kicked back, i.e., it is turned in a direction opposite to the direction of depression, the sewing thread is cut off and the shielding plate 46 is moved upwardly. In this case, the operation instruction signals $S_1$ and $S_2$ are set to "1" and "0", respectively, and the control circuit 32 detects the fact that the foot pedal is in the "kick back" state.

The position detector 24 outputs a needle "up" position signal UP or a needle "down" position signal DN which represents a needle's position. The outputs of the position detector 24 and the pedal detecting circuit 30 are applied to a sewing machine control circuit 34 for controlling the speed of the driving motor 14 and the solenoids (not shown) of the sewing machine.

The sewing machine control circuit 34 has flip-flop circuit type operation signal storing circuits (hereinafter referred to as "FF circuits", when applicable) 62 and 64 to which the operation instruction signals $S_1$ and $S_2$ are applied by the pedal detecting circuit 30. The affirmative output of the FF circuit 62 is applied through an OR circuit 66, as a start signal SRT, to the speed control circuit 32, and the output of the OR circuit 66 is applied through a brake one-shot circuit 68, as a brake signal BK, to the speed control circuit 32. That is, when the operation instruction signal $S_1$ is set to "1" and the affirmative output of the FF circuit 62 is set to "1", then the speed control circuit 32 drives the sewing machine 10 according to the speed instruction signal VC.

The affirmative output of the FF circuit 64 is applied, as a low speed instruction signal LLKD, directly to the speed control circuit 32, and further applied to the OR circuit 66 and a sewing machine control circuit 70. The FF circuit 64 is operated when the foot pedal 28 is kicked back; i.e., when the thread is cut off after the machine has been stopped. When the speed instruction signal $S_2$ is raised to "1" and the affirmative output of the FF circuit 64 is set to "1", the low speed instruction signal LLKD is supplied to the speed control circuit 32, so that the needle is raised. Then, the sewing machine control circuit 70 controls a thread cutting solenoid IS and a thread removing wiper WP. Finally, the needle is stopped at the upper position. When the needle is not at the upper position, in order to stop the needle at the upper position the "up" position signal UP is applied through a NAND circuit 72 to the reset input terminal of the FF circuit 64. In order that no trouble is caused even if, in this case, the foot pedal 28 is depressed erroneously, the affirmative output of the FF circuit 62 is applied to the other input terminal of the NAND circuit 72 through an inverter 74.

For a predetermined period of time after the affirmative outputs of the FF circuits 62 and 64 are set to "0" from "1", the brake one-shot circuit 68 supplies the brake signal BK to the speed control circuit 32 to immediately stop the sewing machine.

Figure 4:
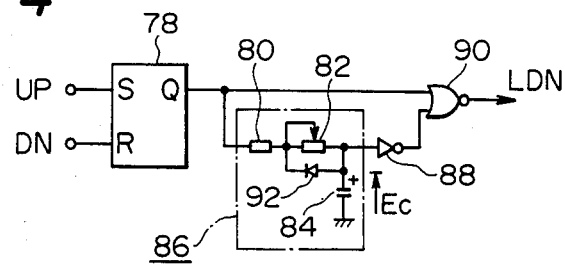
FIG. 4 is an explanatory diagram showing the detailed arrangement of a low speed detecting circuit in FIG. 3.

The sewing machine control circuit 34 has a low speed detecting circuit 76 to which the "up" position detection signal UP and the "down" position detection signal DN are applied by the position detector 24. The circuit 76 is to detect it from the period of the "down" position detection signal DN that the speed of the machine 10 reaches a low value, to output a low speed detection signal LDN to reset the FF circuit 62. The circuit 86 is as shown in FIG. 4 in detail. That is, the circuit comprises: a flip-flop circuit 78 with the set terminal s and the reset terminal r to which the "up" position detection signal UP and the "down" position detection signal DN are applied by the position detector 24, respectively; a time constant circuit 86 including a fixed resistor 80 connected to the affirmative output terminal Q of the circuit 78, a variable resistor 82 and a charging capacitor 84; an inverter 88 to which the capacitor-charged voltage of the time constant circuit 86 is applied; and a NOR circuit 90 to which the output of the inverter 88 and the affirmative output of the flip-flop circuit 78 are applied. Reference numeral 92 in FIG. 4 designates a diode for quickly discharging the capacitor 84.

Figure 5:
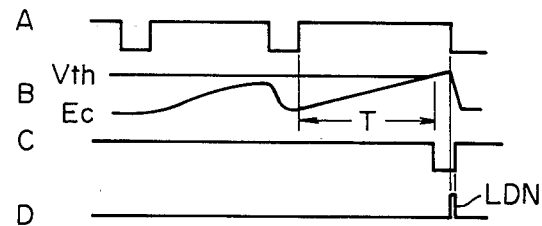
FIG. 5 is an explanatory diagram showing the waveforms of various signals in the low speed detecting circuit in FIG. 4.

The affirmative output of the flip-flop circuit 78 is raised to "1" in response to the "up" position detection signal UP and set to "0" in response to the "down" position detection signal DN, as shown in the part A of FIG. 5. Accordingly, the charge voltage of the capacitor is gradually increased while the affirmative output is at "1", and it is quickly decreased while the affirmative output is at "0", as shown in the part B of FIG. 5. This is repeatedly carried out. When the repetitive period T is increased (i.e., when the speed of the sewing machine 10 is decreased), then the charge voltage exceeds a reference value, whereupon the output of the inverter 88 is set to "0" from "1". As a result, the NOR circuit 90 outputs the low speed detection signal LDN representing the fact that the speed of the machine reaches the low value, to reset the FF circuit 62.

The motor speed control circuit 32 for driving the sewing machine driving motor 14, to which the outputs of the sewing machine control circuit 34 and the speed instruction signal VC of the pedal detection circuit are applied, will be described with reference to FIG. 8.

Figure 6:
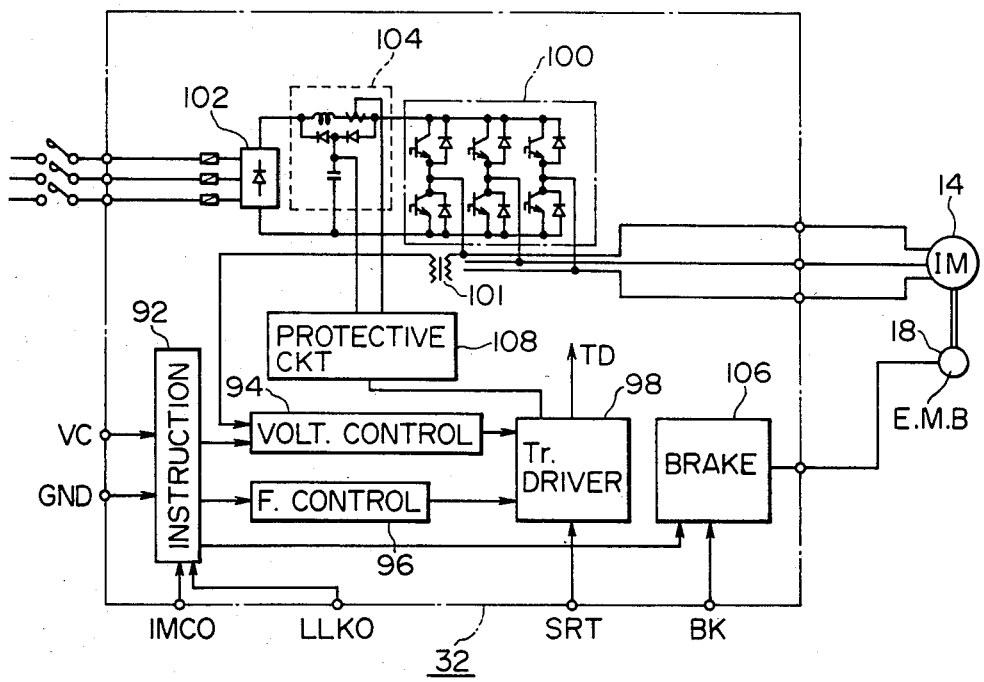
FIG. 6 is an explanatory diagram showing the detailed arrangement of a motor speed control circuit in FIG. 1.

The circuit 32, shown in FIG. 6, comprises: an instruction circuit 92 to which the speed instruction signal VC from the magnetic sensor section in the pedal detecting circuit 30 and a stop preparation instruction signal IMCO and a low speed instruction signal LLKO from the sewing machine control circuit 34 are applied; a voltage control circuit 94 and a frequency control circuit 96 to which a voltage instruction signal and a frequency instruction signal are applied by the instruction circuit 92; a transistor drive circuit 98 to which the outputs of these circuits 94 and 96 and the output start signal SRT of the machine control circuit 34 are applied; a transistor inverter power circuit 100 to which the output TD of the drive circuit 98 is supplied; a rectifier circuit 102 for rectifying three-phase alternate currents; a smoothing circuit 104 connected between the rectifier circuit 102 and the transistor inverter power circuit 100; and a brake circuit to which an output of the instruction circuit 92 and the brake signal BK of the control circuit 34 are supplied. The outputs of the transistor inverter power circuit 100 are supplied to sewing machine driving induction motor 14 to drive the latter 14. The electromagnetic brake 18 is controlled by the output of the brake circuit 106. The smoothing circuit 104 is connected to a protective circuit 108 for detecting abnormal current. The abnormality detection output of the protective circuit 108 stops the driving of the transistor drive circuit 98 thereby to stop the motor 14. The voltage control circuit 94 is coupled through a transformer 101 to the output terminal of the inverter power circuit 100, so that it is stabilized through voltage feedback.

In response to the outputs which are provided by the instruction circuit 92 according to the start signal SRT and speed instruction signals LLKO, IMCO and VC from the control circuit 34, the voltage control circuit 94 and the frequency control circuit 96 adjust the voltage and the frequency, respectively, to maintain the speed of rotation of the motor 14 within a predetermined reference value, and the output of the brake circuit 106 excites the electromagnetic brake 18 so that the needle is stopped at the predetermined position.

The first embodiment of the invention is constructed as described above. Now, its operation will be described.

In order to start a sewing operation, the foot pedal 28 is depressed to cause the magnet 52 to come near the Hall element, as a result of which the magnetic sensor section 60 supplies the sewing speed instruction signal VC to the motor speed control circuit 32, while photointerruptor 44 applies the operation signal $S_1$ which is at "1" to the control circuit 34. Accordingly, the control circuit 34 applies the start signal SRT which is at "1" to the speed control circuit 32, which, in turn, supplies the drive output POWER to the sewing machine drive motor 14 to start driving the latter 14. In the speed control circuit 32, the voltage control circuit 94 and the frequency control circuit 96 provide the voltage and the frequency which are in conformance with the instructed speed, so that the motor 14 is rotated at a predetermined speed.

In order to decrease the speed during sewing, the foot pedal 28 is returned so as to decrease the sewing speed instruction signal VC. In this operation, the operation of the transistor drive circuit is changed for the electrical brake circuit, so that the speed is quickly reduced to a predetermined value.

Figure 7:
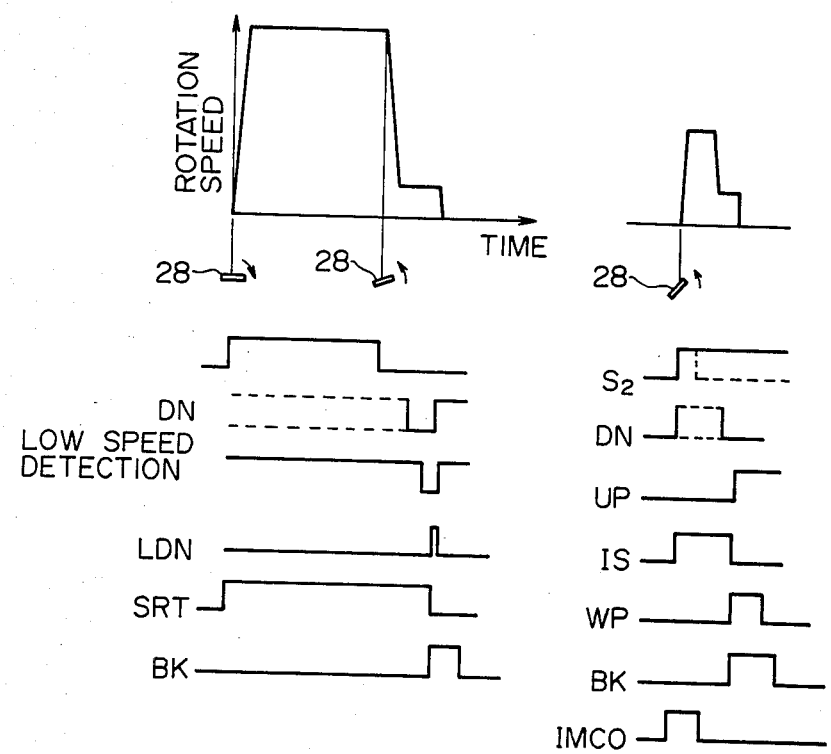
FIG. 7 is an explanatory diagram showing the relationships between various wave forms in a predetermined position stop device and speeds of rotation.

In order that, during such a sewing operation, the direction of sewing is changed under the condition that the cloth is sewed with the needle; i.e., the needle is at the lower position, the foot pedal 28 is returned to its "neutral position", so that the pedal detecting circuit 30 supplies the operation instruction signal $S_1$ which is at "0" to the FF circuit 62 in the sewing machine control circuit 34. Until the stop preparation has been achieved, the FF circuit 62 supplies the start signal SRT which is at "1" to the speed control circuit 32. Therefore, the speed of rotation of the motor 14 is maintained at a predetermined value which is lower than the ordinary sewing speed, as shown in FIG. 7.

During this stop preparation period, the capacitor 84 in the low speed detecting circuit 76 is charged only when the affirmative output of the flip-flop circuit 78 is at "1" according to the "up" position detection signal UP and the "down" position detection signal DN from the position detection circuit 24. Only when the speed of the motor 14 is decreased and the repetitive period T is increased, i.e., the charge voltage of the capacitor 84 exceeds the predetermined value Vth, the inverter 88 supplies the output signal "0" to the NOR circuit 90. Accordingly, at the instant when the affirmative output of the flip-flop circuit 78 is set to "0", the NOR circuit 90 supplies the reset signal LDN to the FF circuit 62, so that the speed of the motor 14 is reduced to the predetermined value. At the same time, the direction changing condition that the sewing needle has come to the lower position is satisfied. Accordingly, at this time instant, the brake one-shot circuit 68 outputs the brake signal BK at "1", which is applied through the brake circuit 106 in the speed control circuit 32 to the motor 14 to stop the latter 14.

In order to cut the thread after the sewing operation, the foot pedal 28 is kicked back, so that the photo-interruptor 42 supplies the thread cutting signal $S_2$ at "1" to the FF circuit 64 in the sewing machine control circuit. In response to this, the FF circuit 64 applies the start signal SRT at "1" and the low speed signal LLKO (and the intermediate speed signal IMCO if necessary) to the speed control circuit 32, while the control circuit 70 is operated, to cut the thread and to remove the thread. The FF circuit 64 is reset by the "up" position detection signal UP at "1" which is provided by the position detector 26, and the sewing machine drive motor 14 is stopped with the needle at the upper position.

In the above-described embodiment, the speed instruction and the operation instruction are made by operating the foot pedal 28; however, those instructions may be made by operating external operating switches.

Figure 8:
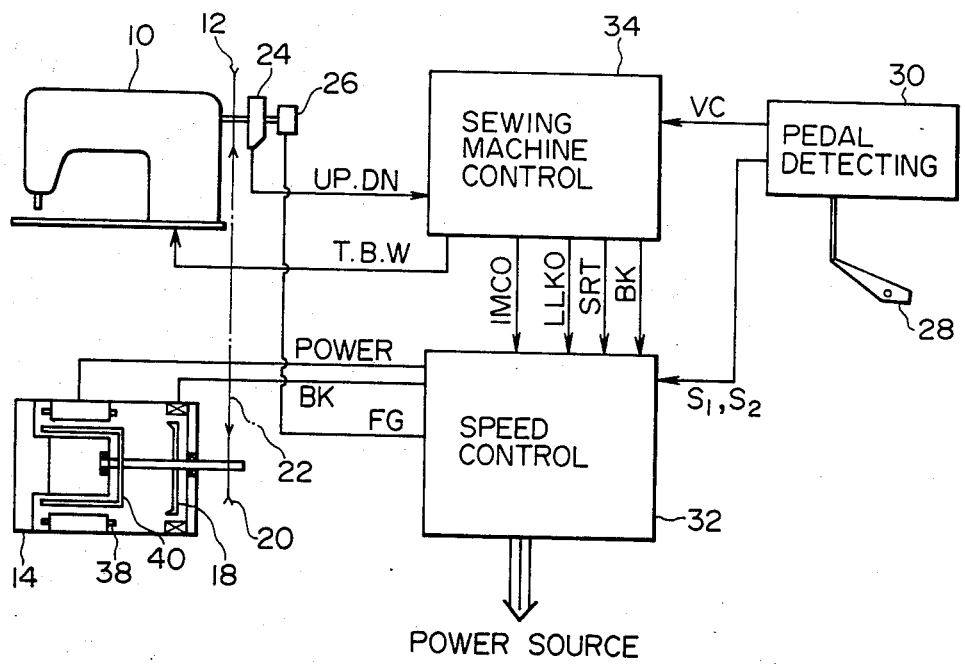
FIG. 8 is an explanatory diagram showing another example of the drive device according to the invention.
Figure 9:
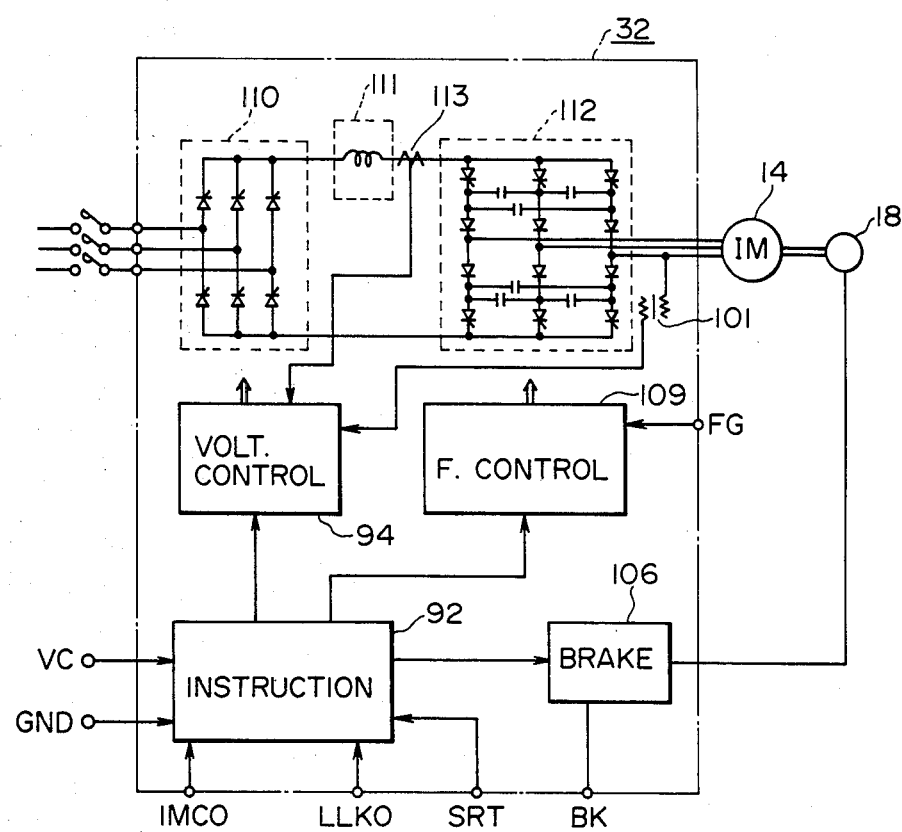
FIG. 9 is an explanatory diagram showing the detailed arrangement of a motor speed control circuit in FIG. 8.

FIGS. 8 and 9 shows another embodiment of the invention for achieving the second object of the invention. In FIGS. 8 and 9, those components which have been previously described with reference to the first embodiment shown in FIGS. 1 through 7 are accordingly similarly numbered. In FIGS. 8 and 9, reference numeral 26 designates a speed detector mounted on the sewing machine 10, for detecting the drive speed of the sewing machine; and 32, a motor speed control circuit for receiving the outputs of the sewing machine control circuit 34 and the speed instruction signal VC of the pedal detecting circuit 30, to drive the sewing machine drive motor 14.

The circuit 32 comprises: an instruction circuit 92 to which the speed instruction signal VC from the magnetic sensor section 60 in the pedal detecting circuit 30 and the start instruction signal SRT, the stop preparation instruction signal IMCO and the low speed instruction signal LLKO from the sewing machine control circuit 34 are applied; a voltage control circuit 94 and a slip correction frequency control circuit 109 to which a voltage instruction signal and a frequency instruction signal are applied by the instruction circuit 92, respectively; a thyristor converter 110 for receiving the output of the voltage control circuit 94 as a firing control signal, to convert three-phase AC voltages into a DC voltage; a thyristor inverter power circuit 112 which is connected in series to the output of the converter 110 through a smoothing circuit 111, and receives the output of the frequency control circuit 109 as a firing control signal; and a brake circuit 106 to which an output of the instruction circuit 92 and the brake signal BK of the machine control circuit 34 are applied. The outputs of the inverter power circuit 112 are supplied to the sewing machine driving induction motor 14 to drive the latter 14, while the electromagnetic brake 18 is controlled by the output of the brake circuit 106.

The frequency control circuit 109 is subjected to servo control with a detection signal FG from the speed detector 26. The voltage control circuit 94 is coupled through a transformer 101 to the output terminal of the inverter power circuit 112, thus being stabilized through voltage feedback. The output of an abnormal current detecting current transformer 113 coupled to the smoothing circuit 111 is supplied to the frequency control circuit 109, so that the converter drive current is interrupted and the motor 14 is stopped.

Figure 3:
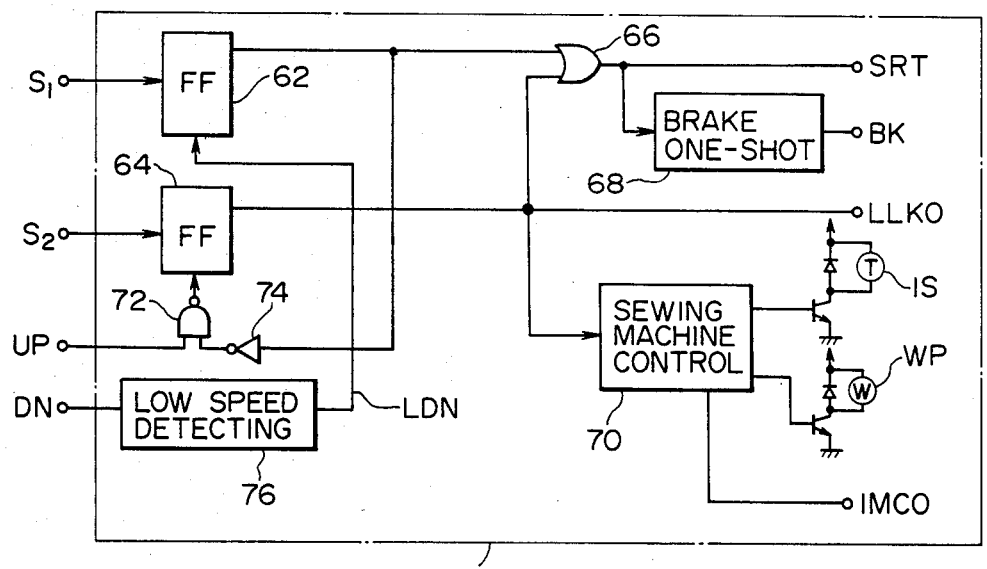
FIG. 3 is an explanatory diagram showing the detailed arrangement of a sewing machine control circuit in FIG. 1.

The sewing machine control circuit 34 including the pedal detecting circuit 30, the low position detecting circuit 76, etc. is similar in arrangement to that of the first embodiment shown in FIGS. 2, 3 and 4.

The second embodiment of the invention is constructed as described above. Now, its operation will be described.

In order to start a sewing operation, the foot pedal 28 is depressed, so as to cause the magnet 52 to approach the Hall element 58. Accordingly, the magnetic sensor 60 supplies the sewing speed instruction signal VC to the motor speed control circuit 32, while the photo-interruptor 44 applies the operation signal $S_1$ of "1" to the control circuit 34. As a result, the control circuit 34 applies the start signal SRT at "1" to the speed control circuit 32, to start the motor 14. In the speed control circuit 32, the voltage control circuit 94 and the frequency control circuit 96 provide the voltage and the frequency which are in conformance with the specified speed, so that the motor 14 is rotated at a predetermined speed.

In order to reduce the speed during sewing, the foot pedal 28 is returned so that the value of the sewing speed instruction signal VC is decreased. Therefore, with the aid of the voltage control circuit 94 and the frequency control circuit 96, the converter 110 and the inverter power circuit 112 operate as inverter and converter, respectively, and regenerative braking is carried out with the induction motor 14 using as generator, so that the speed is quickly decreased and a desired intermediate speed is stably obtained in correspondence to the amount of depression.

In order that, during such a sewing operation, the direction of sewing is changed under the condition that the cloth is sewed with the needle; i.e., the needle is at the lower position, the foot pedal 28 is returned to its "neutral position", so that the pedal detecting circuit 30 supplied the operation instruction signal $S_1$ at "0" to the FF circuit 62 in the sewing machine control circuit 34. Until the stop preparation has been achieved, the FF circuit 62 supplies the start signal SRT at "1" to the speed control circuit 32. Therefore, similarly as in the case of FIG. 7, the speed of rotation of the motor 14 is maintained at a predetermined value which is lower than the ordinary sewing speed.

As was described before, during this stop preparation period, the capacitor 84 in the low speed detecting circuit 76 is charged only when the affirmative output of the flip-flop circuit 78 is at "1" according to the "up" position detection signal UP and the "down" position detection signal DN from the position detection circuit 24. Only when the speed of the motor 14 is decreased and the repetitive period T is increased; i.e., the charge voltage of the capacitor 84 exceeds the predetermined value Vth, the inverter 88 supplies the output signal "0" to the NOR circuit 90. Accordingly, at the instant when the affirmative output of the flip-flop circuit 78 is set to "0", the NOR circuit 90 supplies the reset signal LDN to the FF circuit 62, so that the speed of the motor 14 is reduced to the predetermined value. At the same time, the direction changing condition that the sewing needle has come to the lower position is satisfied. Therefore, at this time instant, the brake one-shot circuit 68 outputs the brake signal BK at "1", which is applied through the brake circuit 106 in the speed control circuit 32 to the motor 14 to stop the latter.

In order to cut the thread after the sewing operation, the foot pedal 28 is kicked back, so that the photo-interruptor 42 supplies the thread cutting signal $S_2$ at "1" to the FF circuit 64 in the sewing machine control circuit. In response to this, the FF circuit 64 applies the start signal SRT at "1" and the low speed signal LLK (and the intermediate speed signal IMCO if necessary) to the speed control circuit 32, while the control circuit 70 is operated to cut the thread and to remove the thread. The FF circuit 64 is reset by the "up" position detection signal UP at "1" which is provided by the position detector 26 and the sewing machine drive motor 14 is stopped with the needle at the upper position.

In the above-described embodiment, the speed instruction and the operation instruction are made by operating the foot pedal 28; however, those instructions may be made by operating external operating switches.

Furthermore in the above-described embodiment, the sewing machine drive motor is the three-phase induction motor; however, it may be a single-phase induction motor.

As is apparent from the above description, according to the invention, the induction motor with the brake mean is driven by the inverter circuit, and accordingly the speed can be steplessly changed to a desired drive speed. Furthermore, as the sewing machine speed can be controlled to the predetermined values at the specified frequency without using the speed detector or the like, unlike the conventional device it is unnecessary to use the unstable variable speed motor and the intricate control circuit.

According to the first embodiment of the invention, in order to quickly decrease the speed of the machine drive device to stop the latter, the electrical braking system using the inverter circuit is used together with the mechanical friction braking system. Therefore, the service life of the braking section is increased when compared with that of the braking section of the conventional sewing machine drive device which employs the mechanical friction braking system only. Furthermore, as the braking section can be miniaturized, the moment of inertia of the output shaft is decreased, which permits the quick acceleration or deceleration which is required during sewing.

According to the second embodiment of the invention, in order to quickly decrease the speed of the sewing machine drive device thereby to stop the latter, the regenerative braking system employing the inverter and the converter is used together with the mechanical friction braking system. Accordingly, the braking section of the drive device is longer in service life than that of the conventional drive device using only the mechanical braking system, and is more economical in the use of energy. Similarly, as the braking section can be miniaturized, the inertial moment of the output shaft is decreased, which permits the quick acceleration or deceleration which is required during sewing.

Employment of the AC induction motor eliminate the inspection and maintenance which may be required in the employment of an DC motor.

The first embodiment of the invention employs the variable voltage and variable frequency type inverter. This is advantageous in that when the sewing machine is started by operating the foot pedal, no start current flows, the power source is scarcely affected and the capacity may be relatively small. As the induction motor is driven by the inverter, the driving is not affected by the frequency: 50 Hz or 60 Hz. Accordingly, the embodiment has an excellent feature that the control device can be unified. Thus, the sewing machine drive device can perform the ideal control.

Furthermore, according to the second embodiment, the variable voltage type converter and the variable frequency type inverter circuit are employed. This is advantageous in that when the sewing machine is started by operating the foot pedal, no start current flows unlike the case of employing a DC motor, the power source is scarcely affected and the capacity may be relatively small. Since the induction motor is driven by the inverter, the driving is not affected by whether the correct frequency is 50 Hz or 60 Hz. Thus, the embodiment has an excellent merit that the control device can be unified. The second embodiment can carry out the ideal control as the sewing machine drive device.

What is claimed is:

1. A sewing machine drive device comprising a sewing machine drive mechanism having an induction motor and a braking unit; and a position detector connected to the output side of said induction motor, characterized by comprising: a stop position control section, a motor speed detection and control circuit including an inverter circuit, said stop position control section causing said motor speed detection and control circuit to subject said induction motor to variable forward driving, to operate said braking unit with the aid of a detection signal from said position detector, and to reverse the direction of rotation of said induction motor when required, thereby to stop the sewing needle at a predetermined position.

2. In a sewing machine, a drive mechanism comprising:
   an induction motor having an input and an output;
   a needle mechanism being driven by said induction motor and having a needle adapted to travel within the range between an upper and a lower position;
   an inverter circuit for driving said induction motor in a variable forward rotation direction or, alternatively, a reverse rotation direction;
   a position detector means for detecting the position of the needle within said range, said position detector being connected to the output side of said induction motor;
   a speed detector means for detecting the rotational speed of said induction motor, said speed detector means being a closed loop servo-control system;
   speed control means, including a foot pedal, responsive to the amount of depression of said foot pedal for controlling said invertor circuit; and
   a stop position control section for stopping said needle at a predetermined position by electric braking of said induction motor in response to the output of said position detector.

3. The sewing machine drive device as claimed in claim 2 further comprising means for changing the phase sequence of said control circuit to reverse the rotation direction of said induction motor.

* * * * *